(12) United States Patent
Chun et al.

(10) Patent No.: US 7,016,377 B1
(45) Date of Patent: Mar. 21, 2006

(54) HOME NETWORK SYSTEM IN ASYMMETRIC DIGITAL SUBSCRIBER LINE SYSTEM

(75) Inventors: Kyung-Joon Chun, Seoul (KR); Nak-Koo Kim, Songnam-shi (KR)

(73) Assignee: Samsung Electronics Co., Ltd., (KR)

( * ) Notice: Subject to any disclaimer, the term of this patent is extended or adjusted under 35 U.S.C. 154(b) by 779 days.

(21) Appl. No.: 09/698,832

(22) Filed: Oct. 27, 2000

(30) Foreign Application Priority Data

Oct. 27, 1999 (KR) ............................... 1999-46856

(51) Int. Cl.
*H04J 1/02* (2006.01)

(52) U.S. Cl. ....................................... 370/493; 370/352

(58) Field of Classification Search ........ 370/493–494, 370/352, 354, 355, 356, 280
See application file for complete search history.

(56) References Cited

U.S. PATENT DOCUMENTS

| | | | | |
|---|---|---|---|---|
| 5,953,409 A | * | 9/1999 | Carlsen ....................... | 379/394 |
| 6,208,637 B1 | * | 3/2001 | Eames ......................... | 370/352 |
| 6,243,377 B1 | * | 6/2001 | Phillips et al. ............... | 370/354 |
| 6,246,679 B1 | * | 6/2001 | Yamamoto ................... | 370/352 |
| 6,266,340 B1 | * | 7/2001 | Pickett et al. ................ | 370/442 |
| 6,356,562 B1 | * | 3/2002 | Bamba ........................ | 370/463 |
| 6,519,250 B1 | * | 2/2003 | Fan .............................. | 370/352 |
| 6,560,222 B1 | * | 5/2003 | Pounds et al. ............... | 370/353 |
| 6,580,785 B1 | * | 6/2003 | Bremer et al. ............... | 379/88.13 |

* cited by examiner

*Primary Examiner*—Ajit Patel
*Assistant Examiner*—Chirag Shah
(74) *Attorney, Agent, or Firm*—Dilworth & Barrese LLP

(57) ABSTRACT

There is provided an IAD (integrated access device) system in an ADSL (Asymmetric Digital Subscriber Line) system. In the IAD system, a first adapter is connected to the telephone one to one and has TDM channel information associated with the first adapter, for converting a voice signal received from the telephone to voice data and transmitting the voice data on a corresponding TDM channel via a telephone line. A second adapter is connected to the computer one to one and has TDM channel information associated with the second adapter, for transmitting data received from the computer on a corresponding TDM channel via the telephone line. A home master has information about the channels of the adapters, compresses voice data and data received via the telephone line, and transmits the compressed data via a general subscriber line. A MACS receives compressed signals from each home via the general subscriber line, decompresses the compressed signals, separates the decompressed signals according to destination networks, and transmits the separated signals to the corresponding networks.

29 Claims, 10 Drawing Sheets

HOME NETWORK SYSTEM IN ASYMMETRIC DIGITAL SUBSCRIBER LINE SYSTEM

PRIORITY

This application claims priority to an application entitled "Home Network System in Asymmetric Digital Subscriber Line System" filed in the Korean Industrial Property Office on Oct. 27, 1999 and assigned Serial No. 99-46856, the contents of which are hereby incorporated by reference.

BACKGROUND OF THE INVENTION

1. Field of the Invention

The present invention relates generally to an integrated access device (IAD) system based on ADSL (Asymmetric Digital Subscriber Line), and in particular, to a home network system that can be built using a two-wire telephone line in a home.

2. Description of the Related Art

ADSL is a high-speed data transmission system operating in an unoccupied higher frequency band of the frequency band of an existing plain old telephone network without interrupting the voice-transmitting Telephone service. The ADSL compresses data received from the Internet to a signal of 1 Mbps or above and transmits the compressed signal to a distributor in a home via a two-wire telephone line. The distributor separates voice and data from the input signal and distributes the voice to a telephone and the data to a computer after decompression. The ADSL system is so configured that one modem is confined to one PC (Personal Computer) in the home. This typical ADSL system is shown in FIG. 1.

Referring to FIG. 1, the typical ADSL system is comprised of an ADSL multiplexer (MUX) 103, a plurality of first distributors 105, and a plurality of homes 110-1, 110-2, and 110-3 connected to each first distributor 105.

The ADSL MUX 103, connected to the Internet, compresses data received from the Internet in a predetermined method and outputs the compressed data to the first distributors 105. The ADSL MUX 103 decompresses compressed data received from the first distributors 105 in accordance with an Internet protocol and outputs the decompressed data to the Internet.

The first distributor 105 shown in FIG. 1 is connected to a central office 101 via a telephone line and to the ADSL MUX 103 via an optical cable. The first distributor 105 combines an input voice signal with compressed Internet data for each home and distributes the combined signal to the home. Hereinafter, the signal of voice and compressed data combined is referred to as an ADSL signal. Specifically, the first distributor 105 transmits data received from the ADSL MUX 103 to a PSTN (Public Switched Telephone Network) subscriber in an upper frequency band of the frequency band of the PSTN. Since 0–4.3 KHz in the PSTN frequency band is generally allocated for the telephone service, a 30 KHz or above frequency band other than the telephone service frequency band is available for data transmission. The data transmission frequency band is divided into an upstream region and a downstream region to separately perform data transmission and data reception. That is, the first distributor 105 loads compressed Internet data in an upper frequency band of the PSTN frequency band in which a voice signal for a specific subscriber has been loaded and transmits the ADSL signal to the subscriber via a corresponding telephone line. On the other hand, the first distributor 105 collects ADSL signals from the homes 110-1, 110-2, and 110-3, separates a voice signal and compressed Internet data from each ADSL signal, and outputs the compressed data to the ADSL MUX 103 and the voice signal to the central office 101.

Each home includes a second distributor 111 connected to the first distributor 105, for separating a voice signal and compressed Internet data from an ADSL signal received from the first distributor 105, combining a voice signal received from a telephone 115 or 127 with input compressed Internet data, and transmitting the ADSL signal to the first distributor 105. An ADSL modem 113 connected to the second distributor 111, for decompressing the compressed Internet data received from the second distributor 111 and outputting the decompressed data to a computer 119, and compressing data received from the computer 119 and outputting the compressed data to the second distributor 111. The telephone 115 or 127 receives the same voice signal from the second distributor 111 and performs a normal call process.

Because the conventional ADSL system employs a point-to-point scheme, a subscriber is limited to one speech path and one data communication line for one telephone number. If two or more persons are to establish their respective speech paths for separate calls, two telephone lines are required. Similarly, if two or more persons want data communication at the same time, a LAN (Local Area Network) for home in addition to the ADSL system is required.

SUMMARY OF THE INVENTION

It is, therefore, an object of the present invention to provide a home network device that enables a plurality of users in a home to separately communicate via one telephone line.

It is another object of the present invention to provide a home network device for enabling a plurality of users in a home to separately communicate data without the need for separately building a LAN with computers.

It is a further object of the present invention to provide a home network device that has the functions of extension call and call forwarding and enables a plurality of users in a home to separately call.

The above objects can be achieved by providing an integrated access device (IAD) system in an ADSL system. In the IAD system, a first adapter is connected to the telephone one to one and has Time Division Multiplex (TDM) channel information associated with the first adapter, for converting a voice signal received from the telephone to voice data and transmitting the voice data on a corresponding TDM channel via a telephone line. A second adapter is connected to the computer one to one and has TDM channel information associated with the second adapter, for transmitting data received from the computer on a corresponding TDM channel via the telephone line. A home master has information about the channels of the adapters, compresses voice data and data received via the telephone line, and transmits the compressed data via a general subscriber line. A Multiservice Access Concentrator System (MACS) receives compressed signals from each home via the general subscriber line, decompresses the compressed signals, separates the decompressed signals according to destination networks, and transmits the separated signals to the corresponding networks.

According to another aspect of the present invention, in an LAD system having at least one telephone and at least one computer in an ADSL system, a first adapter, connected to the telephone one to one and having TDM channel information associated with the first adapter, converts a voice signal received from the telephone to voice data and transmits the voice data on a corresponding TDM channel via a telephone line. A second adapter, connected to the computer one to one and having TDM channel information associated with the second adapter, transmits data received from the computer on a corresponding TDM channel via the telephone line. A home master, having information about the channels of the adapters, compresses voice data and data received via the telephone line and transmits the compressed data via a general subscriber line. A MACS receives compressed signals from each home via the general subscriber line, decompresses the compressed signals, separates the decompressed signals according to destination networks, and transmits the separated signals to the corresponding networks.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention intends to provide a home network system that enables a plurality of users in a home to separately call with a plurality of telephones and to separately make data communications with a plurality of computers. To do so, the home network system is assigned to at least one voice communication channel and at least one data communication channel. While the number of channels is not limited in the present invention, as more channels are used, the data transmission rate is lower. Therefore, it is necessary to determine an optimum number of channels. The number of channels should be agreed between a central office terminal (COT) and a home (or a small office: hereinafter referred to as a home IAD) when a subscriber requests ADSL service. That is, the exchange and homes have to define channels used between them.

Figure 1:
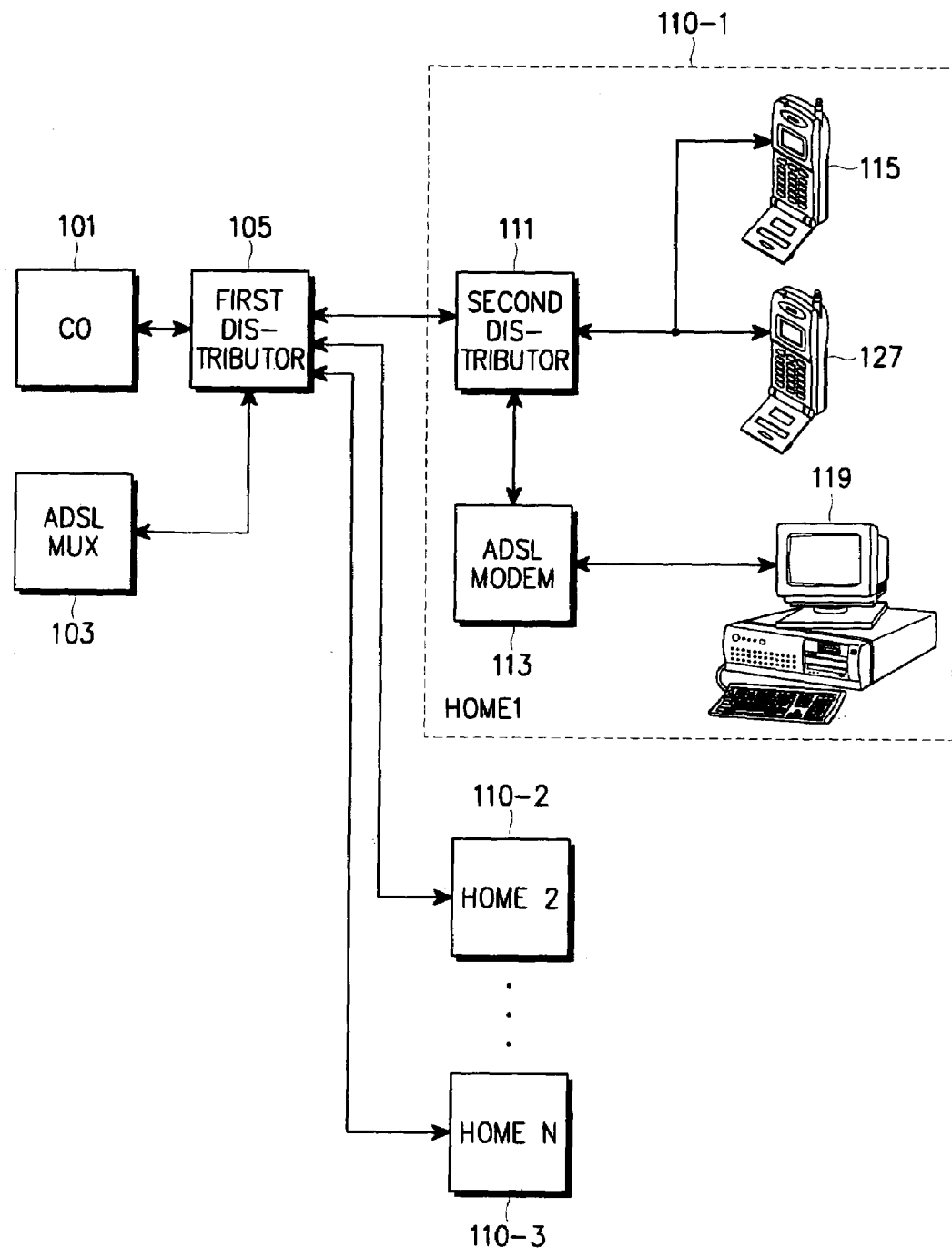
FIG. 1 illustrates a typical ADSL system configuration.
Figure 2:
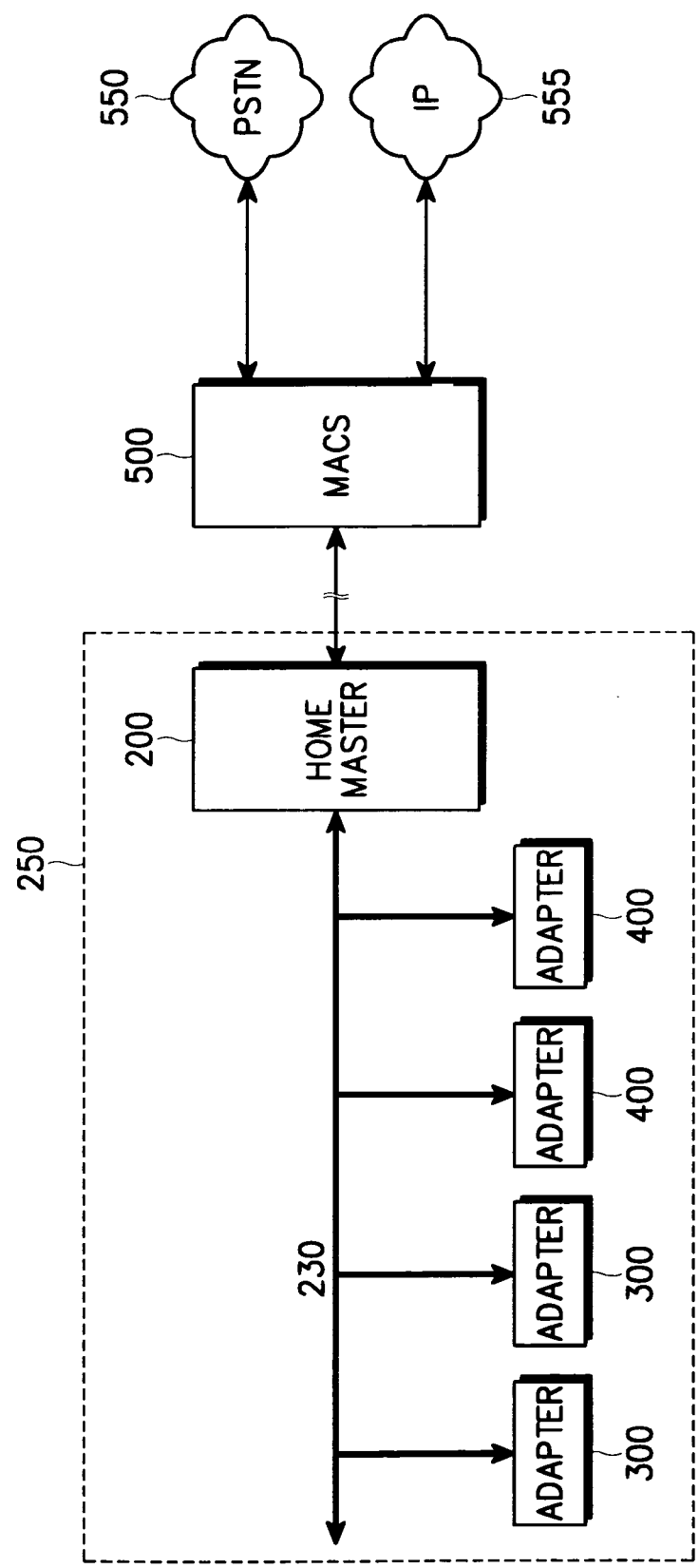
FIG. 2 is a block diagram of an ADSL system according to an embodiment of the present invention.

FIG. 2 illustrates the configuration of a home LAD with two communication channels and two data communication channels according to an embodiment of the present invention.

Referring to FIG. 2, an ADSL system according to the present invention is divided into a home IAD part, existing subscriber lines, and a COT part. The components may play their roles separately or operate in conjunction with each other.

In FIG. 2, the feature of the present invention lies in a MACS 500 that belongs to the COT. The home IAD 250 includes a home master 200 for interfacing ADSL signals with the MACS 500 and a plurality of adapters 300 and 400 connected in parallel between terminals and the home master 200, for interfacing data and voice data between the terminals and the home master 200.

The MACS 500, connected to a PSTN 550 and the Internet (or IP network: Internet Protocol network) 555, has information about channels used by home IADs 250. The MACS 500 compresses voice and Internet data transmitted to and received from the networks 550 and 555 and transmits and receives the compressed data to and from the home IADs 250 via two-wire lines based on the channel information. The MACS 500 combines corresponding voice and Internet data for each home from signals received from the PSTN 550 or the IP network 555 and transmits the ADSL signal to the home master 200 of the home. It also separates voice and Internet data received from the home master 200 of a specific home and transmits them to the corresponding networks. That is, the MACS 500 receives Internet data destined for a specific home from the IP network 555 in a network frequency band including the telephone service frequency band assigned to the home by the PSTN 550, compresses the Internet data, and transmits an ADSL signal having the compressed Internet data in an upper band of the network frequency band to the home master 200 of the corresponding home LAD 250. Also, the MACS 500 decouples compressed Internet data in an upper frequency band from an ADSL signal received from the home master 200 of the home IAD 250, decompresses the Internet data, and transmits the decompressed Internet data to the IP network 555. The MACS 500 transmits a PSTN signal on a telephone frequency band channel to the PSTN 550.

The home master 200 is connected to the MACS 500 by a general subscriber line, namely, a two-wire line, and has information about channels available to the home master 200. On the basis of the channel information, the home master 200 separates a voice signal and data from an ADSL signal received from the MACS 500 via the general telephone subscriber line, builds a frame with the separated signals in a predetermined format, and transmits the frame to corresponding adapters 300 and 400. The home master 200 receives voice data and data in the predetermined frame format from terminals via the adapters 300 and 400, converts the voice data and the data in forms suitable for corresponding channels, and transmits the converted data to the MACS 500 on the corresponding channels via the general telephone subscriber line. The home master 200 is connected to the terminals via a home telephone line, TDM (Time Division Multiplex) home bus 230, and the adapters 300 and 400. The frames are generated in TDM and communicated between the home master 200 and the adapters 300 and 400 on the home telephone line, the home bus 230. As stated above, the home master 200 interfaces between the MACS 500 and the home bus 230 and operates in conjunction with the MACS 500. The home bus is a two-wire telephone line.

Terminals include telephones and computers. The adapters 300 and 400 are connected between the home master 200 and the terminals to interface them. The adapters 300 are used for voice transmission and the adapters 400, for data communication. The adapters 300, having information about channels available to them, detects information on their channels, that is, voice data from an input signal, converts the voice data to a voice signal, and outputs the voice signal to telephones. FIG. 2 illustrates the case that two telephones (not shown) are used. In FIG. 2, an adapter 300 connected to each telephone has information about a different voice channel in a different frequency band.

Figure 7:
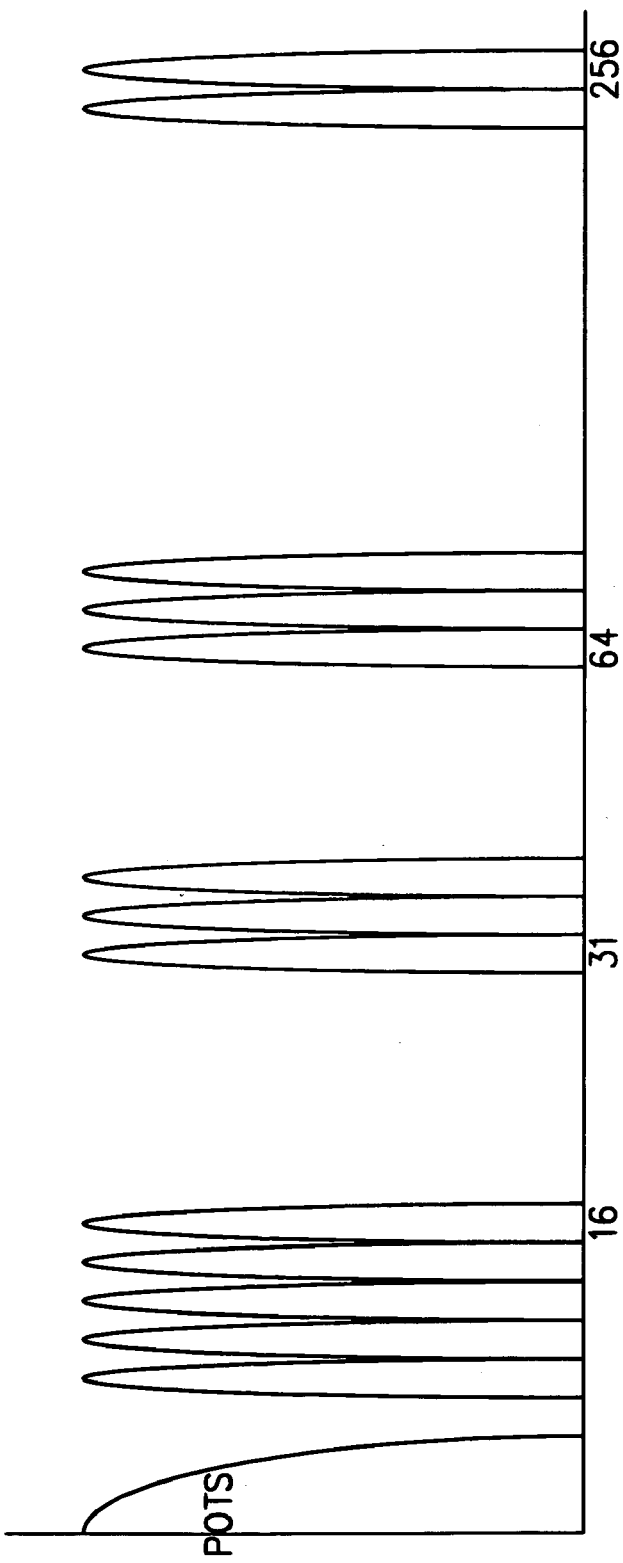
FIG. 7 illustrates a channel structure in the frequency domain according to the embodiment of the present invention.

Before presenting a description of the configuration of the home IAD 250, a channel structure between MACS and IAD will be described with reference to FIG. 7. According to the present invention, the channel structure is comprised of a telephone frequency band channel to transmit an analog ring signal and a voice signal, a voice data channel to transmit a digital voice signal and a data channel on which to transmit data. The telephone frequency band channel is in the lowermost frequency band and the data channels are in a higher frequency band, following the voice channel. Two or more voice data channels can be established. Each of the voice data channels occupies 64 KHz, on both the downlink and the uplink. The bandwidth of the data channel varies depending on the number of channels and at least one data channel is provided. FIG. 7 illustrates a channel structure having a telephone frequency band and 256 voice channels over the whole ADSL signal frequency band. The 256 voice channels include a plurality of upstream voice channels and a plurality of downstream voice channels. Among the upstream voice channels, one channel having a pilot tone exists. Similarly, there is one channel with a pilot tone among the downstream voice channels.

Table 1 shows a channel structure of IAD 250 with two voice channels and two data channels and its bandwidth in the frequency domain according to a first embodiment of the present invention. Table 2 shows a channel structure with four voice channels and two data channels at 2,048 Kbps twice higher than in Table 1 and its bandwidth in the frequency domain according to a second embodiment of the present invention.

TABLE 1

| Channel Type | Channel | Down | Up |
| --- | --- | --- | --- |
| telephone 1 | CH 0 | 64 Kbps | 64 Kbps |
| telephone 2 | CH 1 | 64 Kbps | 64 Kbps |
| PC 1 | CH 2 | 192 Kbps | 64 Kbps |
| PC 2 | CH 3 | 192 Kbps | 64 Kbps |
| bandwidth | | 512 Kbps | 256 Kbps |
| frame | | 32 Kbps | 32 Kbps |
| signaling (D-Ch) | | 32 Kbps | 32 Kbps |
| spare 1 | | 40 Kbps | 40 Kbps |
| spare 2 | | 24 Kbps | 24 Kbps |
| total bandwidth | 4 CH | 640 Kbps | 384 Kbps |

TABLE 2

| Channel Type | Channel | Down | Up | |
| --- | --- | --- | --- | --- |
| telephone 1 | CH 0 | 64 Kbps | 64 Kbps | |
| telephone 2 | CH 1 | 64 Kbps | 64 Kbps | |
| telephone 3/PC 3 | CH 2 | 64 Kbps | 64 Kbps | telephone or PC selective |

TABLE 2-continued

| Channel Type | Channel | Down | Up | |
| --- | --- | --- | --- | --- |
| telephone 4/PC 4 | CH 3 | 64 Kbps | 64 Kbps | telephone or PC selective |
| PC 1 | CH 4 | 512 Kbps | 128 Kbps | |
| PC 2 | CH 5 | 512 Kbps | 128 Kbps | |
| Bandwidth | | 1280 Kbps | 512 Kbps | |
| Frame | | 32 Kbps | 32 Kbps | |
| signaling (D-Ch) | | 32 Kbps | 32 Kbps | |
| spare 1 | | 40 Kbps | 40 Kbps | |
| spare 2 | | 24 Kbps | 24 Kbps | |
| total bandwidth | 6 CH | 1408 Kbps | 640 Kbps | |

Figure 10:
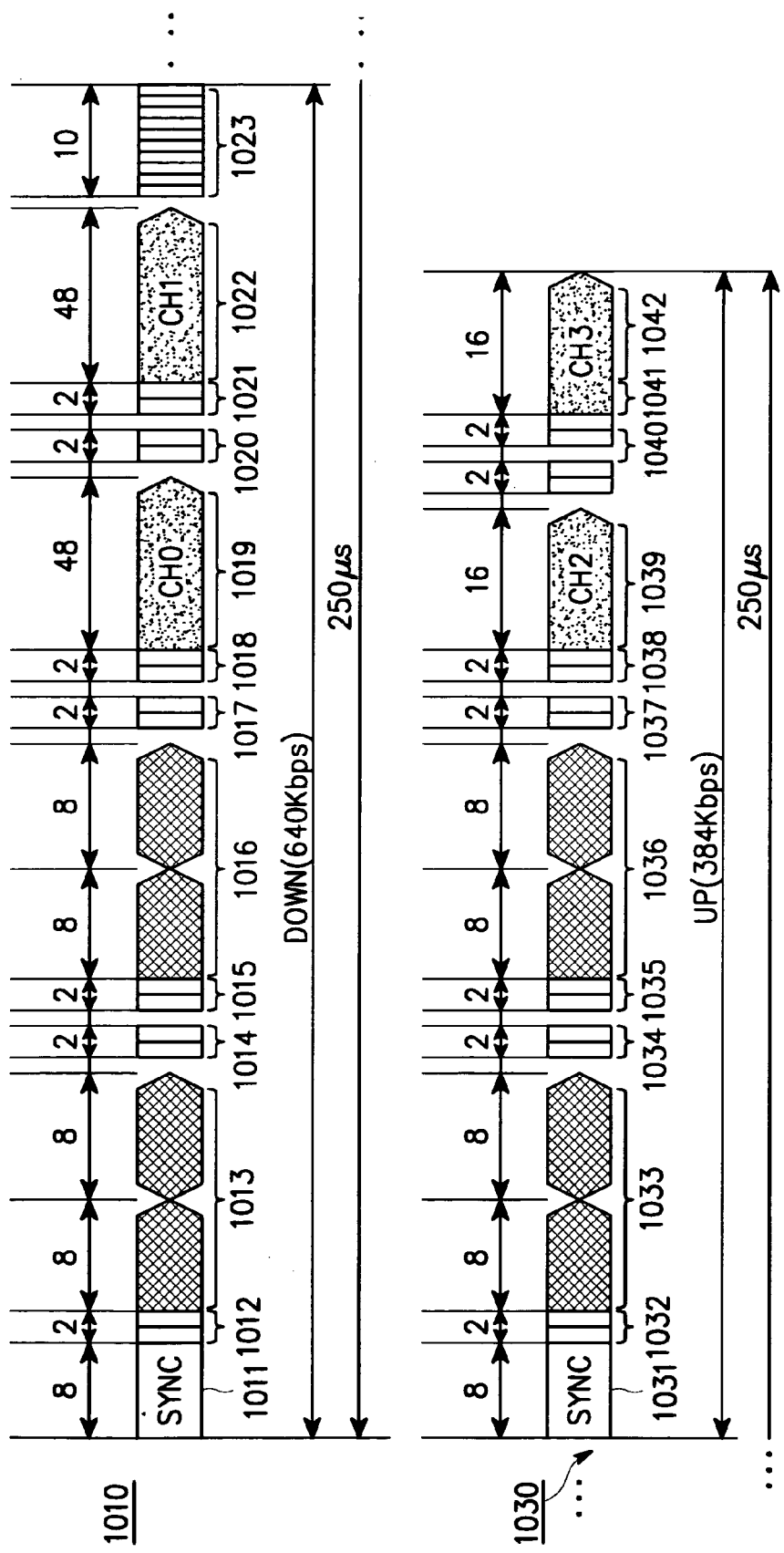
FIG. 10 illustrates the structure of a data frame and ping-pong timing according to the embodiment of the present invention.

The channel structure of IAD shown in Table 1 is illustrated in the time domain in FIG. 10.

Referring to FIG. 10, the channel structure is comprised of a downlink 1010 (a signal transmission from the home master 200 to adapters 300 and 400) and an uplink 1030 (a signal transmission from plurality of adapters 300 and 400 to the home master 200). A sync channel 1011, D-Chs 1012, 1014, 1015, 1017, 1018, 1020, and 1021, voice channels 1013 and 1016, and data channels 1019 and 1022 are on the downlink 1010. The sync channel 1011 informs the starting point of a data frame shown in FIG. 10, occupying 8 bits. The D-Chs 1012 to 1021 transmit signaling signals, each occupying 2 bits. The two voice channels 1013 and 1016 transmit voice, each occupying 16 bits. Channels 1019 and 1022 are each assigned 48 bits. The guard period 1023 provide for a guard time between downlink and up link.

On the uplink 1030 have an 8-bit sync channel 1031, 2-bit D-Chs 1032, 1034, 1035, 1037, 1038, 1040, and 1041, 16-bit voice channels 1033 and 1036 corresponding to the downlink voice channels 1013 and 1016, and 16-bit data channels 1039 and 1042 corresponding to the downlink data channels 1019 and 1022.

Figure 3:
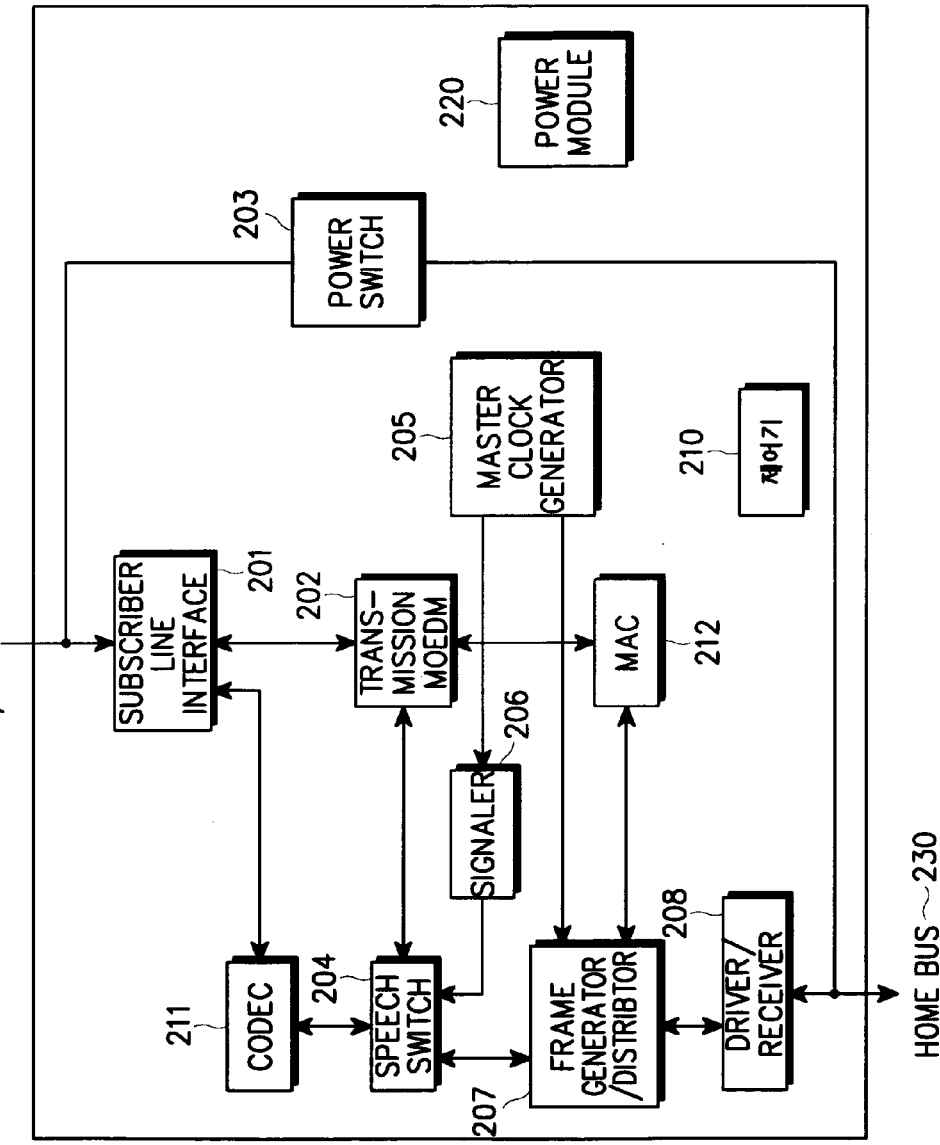
FIG. 3 is a block diagram of a home master shown in FIG. 2.

FIG. 3 is a detailed block diagram of the home master 200. Referring to FIG. 3, there will be given a description of the configuration and operation of the home master 200. In FIG. 3, a controller 210 provides overall control to the home master 200. The controller 210 has predetermined channel information, that is, information about the number of channels available to the home IAD 250, the frequency bands and transmission rates of the channels, and total bandwidth, and the unique numbers of the adapters 300 and 400 associated with the channels.

A subscriber line interface 201 interfaces signals transmitted/received through the subscriber line, operating in conjunction with the MACS 500. The subscriber line interface 201 detects a voice signal on a telephone frequency band channel from an input signal, outputs the voice signal to a CODEC 211, and outputs the other data channel signals to a transmission modem 202. On the other hand, the subscriber line interface 201 receives a voice signal from the CODEC 211 and a data signals from the transmission modem 202, and transmits the voice signal to the MACS 500 on the telephone frequency band channel, the data signals to the MACS 500 on the data channels.

The transmission modem 202 decompresses the channels other than the telephone frequency band channel, separates the decompressed channels, and outputs voice data channels to a speech switch 204 and data channels to a MAC (Medium Access Controller) 212. Also, the transmission modem 202 can control upstream and downstream transmission rates and the number and sizes of channels. To do so, the MACS 500 should also control the data transmission rate and the number and sizes of channels used in the home having the transmission modem 202.

The CODEC 211 performs the double functions of subscriber circuit interfacing and PCM (Pulse Code Modulation) coding. In the former, the CODEC 211 notifies the controller 210 of receipt of a ring signal upon detection of the ring signal from the telephone frequency band channel in the subscriber line interface 201. In the latter, the CODEC 211 detects a voice signal from the telephone frequency band channel, converts the voice signal to voice data, and outputs the voice data to the speech switch 204.

On a power-off condition, a power switch 203 automatically switches directly to telephones so that the telephones can be used as existing plain old telephones in the home. The power switch 203 may be a relay.

Figure 8:
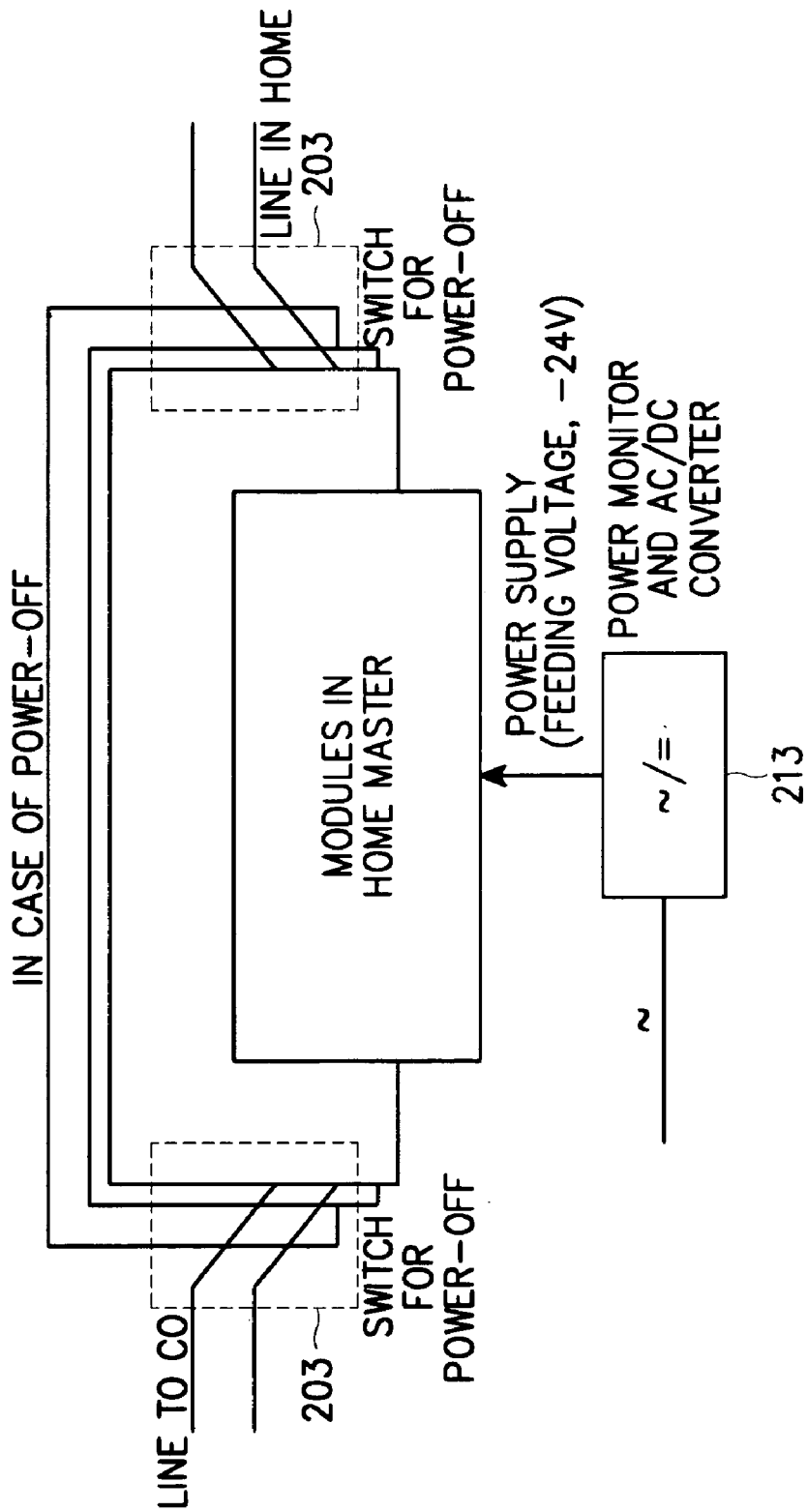
FIG. 8 is a block diagram of a power switch shown in FIG. 3.
Figure 9:
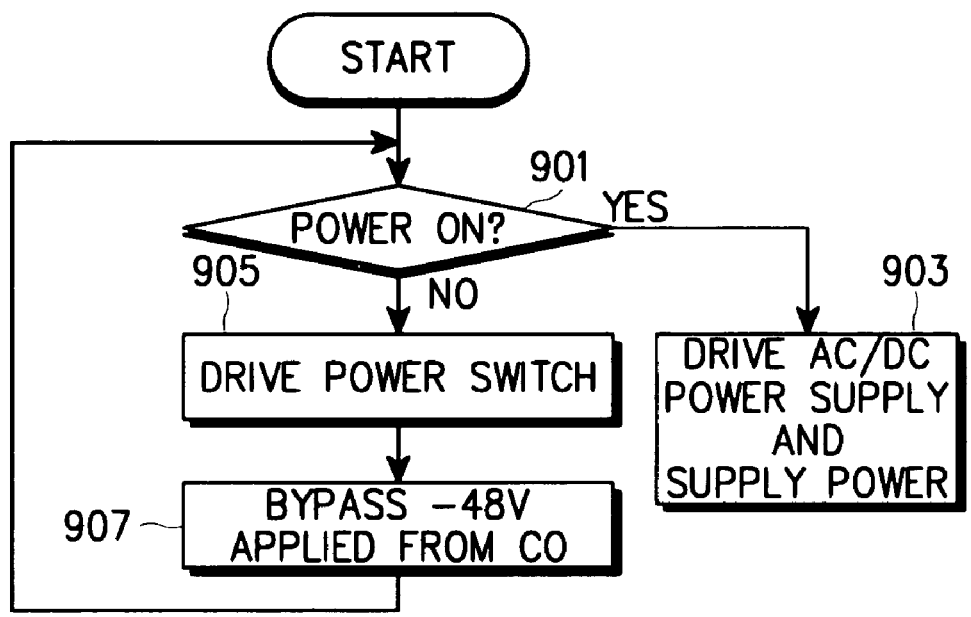
FIG. 9 is a flowchart illustrating the operation of the power switch shown in FIG. 3.

With reference to FIGS. 8 and 9, the power switch 203 will be described in more detail. Referring to FIG. 8, the power switch 203 connects the COT to a terminal by connecting the home master 200 to the voice adapters 300 or the data adapters 400 upon input of external power. On the contrary, if there is no input of external power, the power switch 203 being a relay connects the COT to the terminal directly. Then, the terminal can transmit and receive a ring signal and a voice signal on the telephone frequency band channel.

Referring to FIG. 9, the controller 210 determines whether power is supplied in step 901. Upon input of power, the controller 210 switches the power switch 203 to the modules of the home master 200 and drives an AC/DC converter 213, thereby supplying power to the modules in step 903. If power is not supplied, the controller 210 turns off the power switch 203 in step 905 and directly bypasses a signal from the COT to a line in the home.

Referring back to FIG. 3, the speech switch 204 switches voice data in the manner of a time switch or a space switch. Specifically, the speech switch 204 receives voice data from the CODEC 211 and the transmission modem 202 and transmits the voice data to a frame generator/distributor 207 under the control of the controller 210. Also, the speech switch 204 transmits voice and data between terminals in the home IAD 250 in the case of an extension call.

A signaler 206 generates all tones (dial tones, busy tones, and etc.) and ring tone data needed for receiving a DTMF signal being digit PCM data and processing a call. The CODEC 211 senses a ring signal indicative of call incoming in the telephone frequency band through the subscriber line interface 201 and notifies the controller 210 of detection of the ring signal. Then, the controller 210 controls the speech switch 204 to connect a speech path and informs a subscriber of call incoming in one of the following two ways.

First, the controller 210 controls the signaler 206 to generate ring tone data upon sensing an incoming call and transmits the ring tone data on a corresponding voice channel through the speech switch 204 and the frame generator/distributor 207. This method is viable only when the voice adapters 300 have speakers.

Secondly, the controller 210 directly transmits a signaling signal indicative of receipt of the ring signal on a downlink D-Ch to the voice adapters 300 upon sensing an incoming call and the voice adapters 300 generate a ring sound. In this case, the voice adapters 300 are required to be configured to generate a ring signal.

If the subscriber is informed of the incoming call in one of the above ways and takes off-hooks a telephone, a corresponding adapter 300 notifies the controller 210 of the off-hook state via an uplink D-Ch on the home bus 230.

Then, the controller 210 controls the CODEC 211 to generate an off-hook signal and transmit the off-hook signal to the MACS 500 through the subscriber line interface 201. Thus, a call is connected.

Upon generation of another incoming call with the telephone frequency band channel in use, the MACS 500 detects the call and transmits the call to the home IAD 250 on an voice data channel because the telephone frequency band channel is not available. The voice call is input to the home master 200 of the home IAD 250 through voice data channel. The transmission modem 202 notifies the controller 210 of another voice call incoming and the controller 210 controls the signaler 206 to transmit ring tone data to a corresponding adapter 300 through the speech switch 204, the frame generator/distributor 207, and a driver/receiver 208 in the first way, or controls the MAC 212 and the frame generator/distributor 207 to transmit a control signal indicative of the voice call incoming on a downlink D-Ch to the adapter 300 in the second way. If a corresponding telephone is taken off-hook, i.e., is answered, the home master 200 is informed of the off-hook State from the adapter 300 through a corresponding uplink D-Ch. The home master 200 informs the MACS 500 of the off-hook state on a signaling channel of the transmission modem 202. A controller 502 of the MACS 500 controls a subscriber interface 505 to transmit a hook-off signal to the COT. Then, a CODEC (not shown) in the subscriber interface 505 of the MACS 500 converts caller voice to PCM data and transmits the PCM data to the home master 200 on a 64-Kbps channel assigned for voice in the data frequency band of the transmission modem 202. The home master 200 assigns a communication channel for the voice call. A voice signal of a person called is transferred to a caller in the reverse order of the above-described procedure.

For call origination, when a voice adapter 300 detects the off-hook state of the terminal, it generates an off-hook signal and transmits the off-hook signal to the home master 200 via the corresponding uplink D-Ch on the home bus. The off-hook signal is fed to the controller 210 1% through the driver/receiver 208, the frame generator/distributor 207, and the MAC 212. The controller 210 transfers the off-hook signal to the MACS 500 through the transmission modem 202 and the subscriber line interface 201 and the MACS 500, in turn, transmits the off-hook signal to the COT. The controller 210 assigns a voice channel to the speech switch 204, while setting the control of the signaler 206 in a DTMF tone detecting state. Upon receipt of the off-hook signal, the COT transmits dial tones to the subscriber through the MACS 500, the home master 200, and the corresponding adapter.

When the subscriber dials a telephone number, hearing the dial tones, a telephone number signal is converted to telephone number data in a voice adapter 300 and transmitted to the home master 200. The controller 210 of the home master 200 detects the telephone number data from the signaler 206 through the driver/receiver 208, the frame generator/distributor 207, and the speech switch 204 and determines whether the telephone number data is related with an external telephone number or an extension line number. In the case of an external telephone number, the controller 210 controls the signaler 206 to generate tones corresponding to the telephone number and transmit the tones to the MACS 500 through the speech switch 204. If the telephone frequency band channel is available, the tones are transmitted on the telephone frequency band channel through the speech switch 204, the CODEC 211, and the subscriber line interface 201. If the telephone frequency band channel is in use, the tones are transmitted on a corresponding voice data channel through the speech switch 204, the transmission modem 202, and the subscriber line interface 201. In the case of an extension line number, the controller 210 controls the speech switch 204 to perform an extension call process.

Every call is processed first in the telephone frequency band. A data frequency band assigned for voice is used only when the telephone frequency band channel is not available. In the data frequency band, all signals (on-hook/off-hook are transmitted on a control channel assigned in the data frequency band. The MACS 500 senses receipt of a ring signal from the COT and informs the home master 200 of receipt of the ring signal on a corresponding voice channel.

A master clock generator 205 generates a master clock signal and transmits it to components that require it in the home master 200. The adapters 300 and 400 receive voice and data in frames constructed in the home master 200 according to the mater clock signal, extract clock components, and recovers a clock signal in synchronization to the mater clock signal. This implies that the adapters 300 and 400 operate in synchronization to the master clock signal.

Upon receipt of a data channel from the transmission modem 202, the MAC 212 outputs the received channel data to the frame generator/distributor 207 and acts as a server in the home. The MAC 212 has external IP addresses to make external data communication and internal IP addresses to implement the server function, and can facilitate data communications between computers in the home via the IP addresses.

The frame generator/distributor 207 receives a voice channels and a data channel from the speech switch 204 and the MAC 212, constructs a frame as shown in FIG. 10, outputs the frame to the driver/receiver 108, separates a frame received from the driver/receiver 208 into voice channels and data channels, and outputs the voice channels and the data channels to the speech switch 204 and the MAC 212, respectively.

The driver/receiver 208 drives the home bus, transmits and receives TDM channel data in the form shown in FIG. 10 to and from the adapters 300 and 400, and matches impedance to reliably transfer the signals.

A power module 220 receives a generally used power supply voltage, (e.g. 220V) and generates a feeding voltage of −24V and a required DC voltage.

Figure 4:
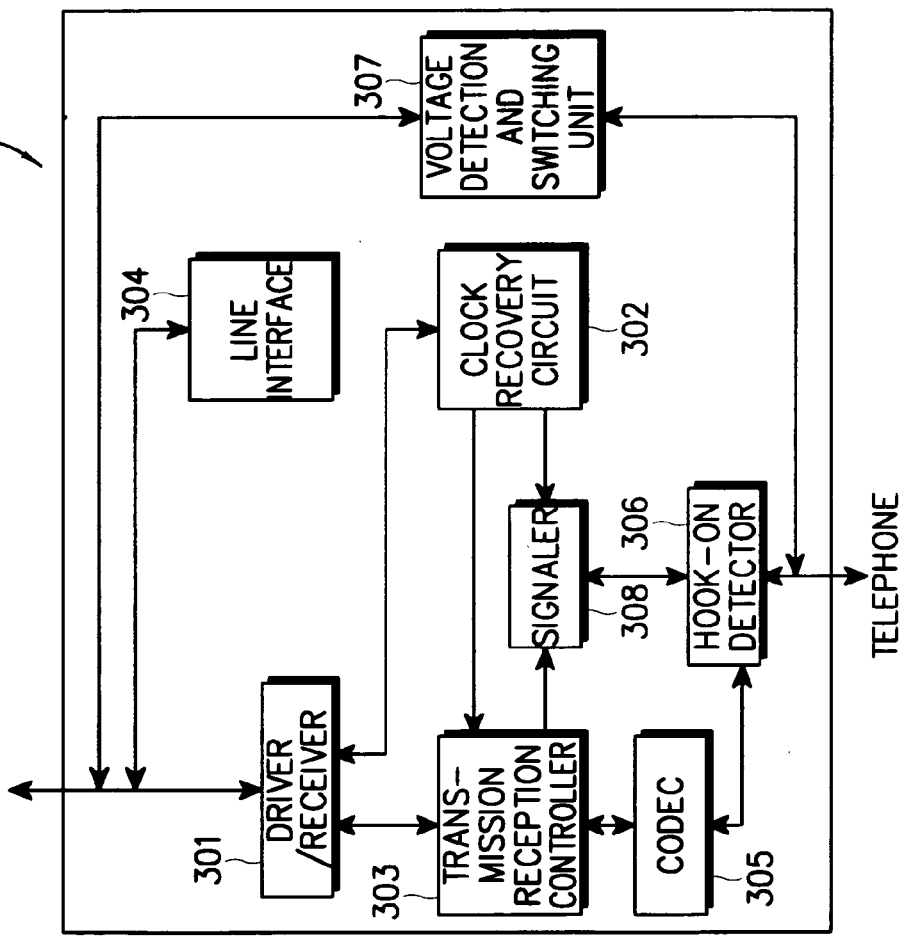
FIG. 4 is a block diagram of a typical telephone adapter shown in FIG. 2.

FIG. 4 is a block diagram of a voice channel adapter, i.e., a telephone adapter according to the embodiment of the present invention. Referring to FIG. 4, the telephone adapter 300 includes a driver/receiver 301, a clock recovery circuit 302, a line interface 304, a transmission/reception controller 303, a CODEC 305, a on-hook detector 306, a voltage detection and switching unit 307, and a signaler 308. The driver/receiver 301 interfaces with the home master 200. The line interface 304 matches impedance that varies with line length. The clock recovery circuit 302 recovers a synchronized clock signal from sync channel signal 1011 received from the driver/receiver 301 using a digital phase lock loop (DPLL), that is, the same clock signal as generated in the master clock signal generator 205. The transmission/reception controller 303 receives the recovered clock signal, extracts a frame sync signal from a frame received from the home master 200, detects a channel data assigned to the transmission/reception controller 303 for data transmission/reception in a ping-pong manner, transmits the assigned channel data to the CODEC 305, and communicates with the home master 200 in a D channel. The CODEC 305 receives the recovered clock signal, converts voice data of the channel assigned to the CODEC 305, received from the driver/receiver 301, to a voice signal, outputs the voice signal to a corresponding telephone, converts an input voice signal to PCM voice data, and outputs the PCM voice data to the driver/receiver 301 through the transmission/reception controller 303. The hook-on detector 306 senses the on-hook state/off-hook state of the telephone and connects the CODEC 305 to the telephone and, in the off-hook state, notifies the controller 210 of the home master 200 of the off-hook state on the D-Ch. The voltage detection and switching unit 307 detects the voltage of data received from the home master 200. If the voltage is externally input, the voltage detection and switching unit 306 is off, and otherwise, it is on, to thereby bypass a signal received from the home master 200 to the telephone. A signaler 308 receives the clock signal from the clock recovery unit 302 upon an incoming call and generates a ring signal under the control of the transmission/reception controller 303.

The telephone adapter 300 can be connected to an RJ11 connector and a channel number is fixedly set for the telephone adapter 300 in hardware when it is installed. The telephone adapter 300 usually transmits/receives a channel designated in TDM on the home bus. If power is off in the home, the telephone adapter 300 is connected directly to the COT like an existing plain old telephone without the TDM channel assignment.

If a clock signal is recovered in the clock recovery unit 302, data is communicated based on the recovered clock signal. Here, voice data is communicated with the home master 200 in a ping-pong manner. In the channel structure shown in Table 1, data is transmitted and received in the ping-pong manner as depicted below.

The home master 200 transmits a frame including data of a 1 or 2-Mbps on n data channels, clock sync signal on sync channel, two voice channels, a D-channels, and a terminal as a slave receives the frame after a time delay T1. Every terminal receives downlink frame. After a time T2, terminal #0 transmits data to the home master 200. The other terminals wait for their turns and transmit data along with a start signal time T3 after their previous terminals transmit data. Therefore, one occurrence of transmission/reception takes 250 μs. Since voice data is communicated in PCM, two channels are assigned for one transmission/reception operation.

Internet data is transmitted upstream at a variable rate up to 64 Kbps and downstream at a variable rate up to 512 Kbps.

Figure 5:
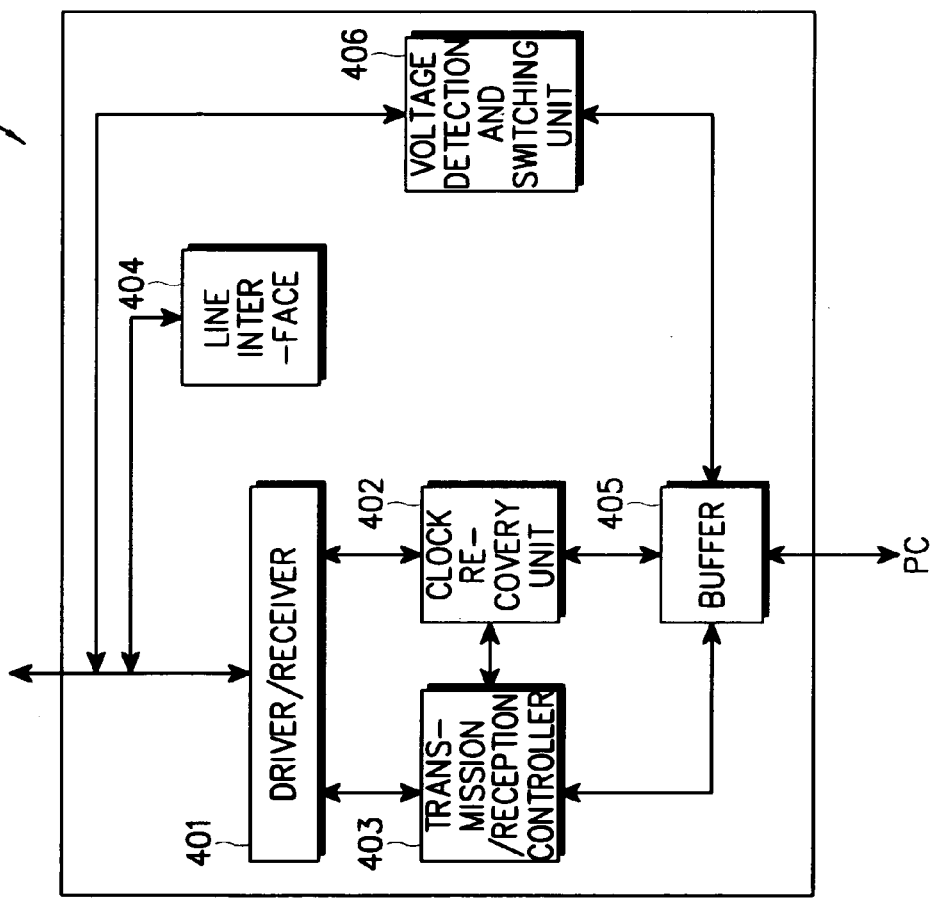
FIG. 5 is a block diagram of a computer adapter shown in FIG. 2.

FIG. 5 is a block diagram of a data adapter, that is, a computer adapter according to the embodiment of the present invention. Referring to FIG. 5, the computer adapter 400 is comprised of a driver/receiver 401, a clock recovery circuit 402, a transmission/reception controller 403, a line interface 404, a buffer 405, and a voltage detection and switching unit 406. The driver/receiver 401 interfaces between the home master 200 and a computer. The line interface 404 matches impedance generated from a transmission line between the home master 200 and the computer. The clock recovery circuit 402 receives channels from the driver/receiver 401 and recovers the same clock signal as the master clock signal generated from the master clock generator 205 from sync channel signal using a DPLL. The transmission/reception controller 403 receives the clock signal from the clock recovery circuit 402 and selects a corresponding channel among the channels received from the driver/receiver 401. The buffer 405 buffers the channel data received from the transmission/reception controller 403 and data received from the computer. The buffer 405 acts to provide timing for communication between the computer and the home master 200. That is, the buffer 405 divides packet data received from the computer in a TDM format, transmits the divided data to the home master 200, and converts packet data received from the home master 200 in the form of a USB- or Base 10 T-signal suitable for PC communication. The voltage detection and switching unit 406 detects the voltage of the telephone adapter 400 and performs switching.

Figure 6:
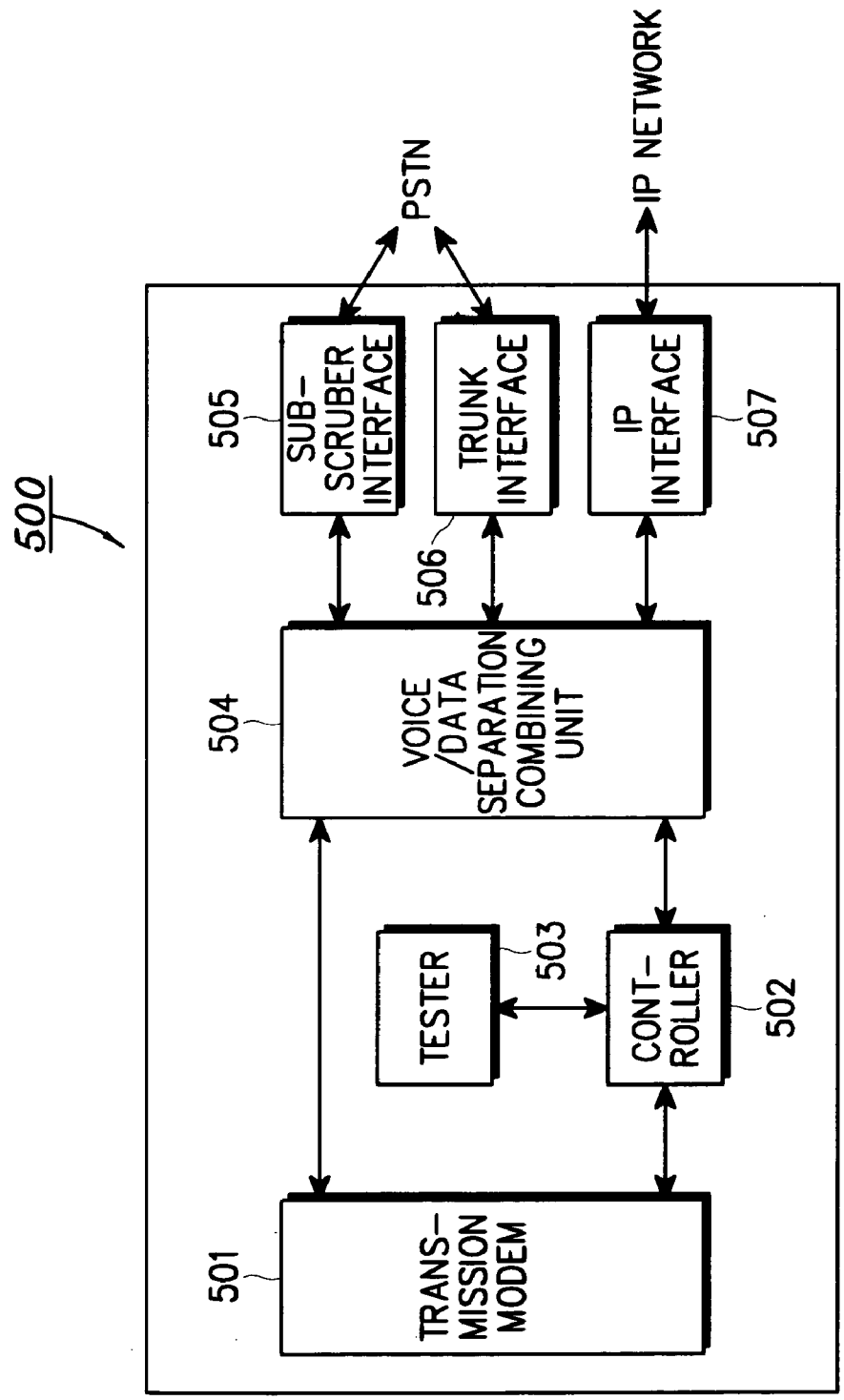
FIG. 6 is a block diagram of a MACS (Multiservice Access Concentrator System) shown in FIG. 2.

FIG. 6 is a block diagram of the MACS 500. Referring to FIG. 6, the subscriber interface 505 interfaces with a subscriber card of the PSTN 550 and processes voice transmitted to and received from the subscriber card. A trunk interface 506 interfaces with an E1 trunk of the PSTN 550 and processes voice transmitted to and received from the E1 trunk. An IP network interface 2, 507 interfaces with the IP network 555 and processes data transmitted to and received from the IP network 555. A voice/data separation/combining unit 504 combines or separates voice and data received from the subscriber interface 505, the trunk interface 506, the IP network interface 507, and the home master 200 by the channels. In other words, the voice/data separation/combining unit 504 converts voice received from the subscriber interface 505 or the trunk interface 506 to voice data and outputs voice data and IP data destined for a specific home network to a transmission modem 501 on a corresponding channel. A tester 503 maintains and manages the MACS 500 and the home master 200. The controller 502 provides overall control to the MACS 500, processes data received from a plurality of home masters 200, and conducts communication between an operator and the system by MMC (Man Machine Communication). The transmission modem 501 compresses a combined signal received from the voice/data separation/combining unit 504 in DMT. On the other hand, the transmission modem 501 decompresses compressed signals received from the plurality of home masters 200 and outputs the decompressed signals to the voice/data separation/combining unit 504. The voice/data separation/combining unit 504 separates decompressed voice and IP data for each home IAD and transmits the decompressed data to the PSTN 550 and the IP network 555 through the subscriber interface 505, the trunk interface 506, and the IP network interface 507.

A call process in the above-described structure will be described with call origination and call termination separately considered. Call Origination: if a user off hooks a telephone, the on-hook detector 306 of the telephone terminal 300 senses the off-hook state and transmits an off-hook signal to the home master 200 on a signaling channel (D-Channel) in a frame of the home bus, a D-Ch. The controller 210 of the home master 200 assigns a speech path to the speech switch 204 and informs the COT of the off-hook state via the telephone frequency ban channel through the subscriber line interface 201. Dial tones transmitted from the COT is applied to the speech switch 204 through the CODEC 211 and then transmitted to the telephone in the assigned speech path through the frame generator/distributor 207 and the driver/receiver 208. If a caller wants an external call, which implies that an intended telephone number does not have either of function keys # and *, the signaler 206 is released and the subscriber is connected directly to the COT. Thus, the telephone number is transmitted on the telephone frequency band channel to the COT through the driver/receiver 208, the frame generator/distributor 207, the speech switch 204, and the CODEC 211. Then, the call is processed in the COT in the same manner as a typical call. If the user wants an extension call, which implies that an intended telephone number is two digits with a function key # or *, the controller 210 deactivates the CODEC 211 and performs an extension call process without involving the COT.

If a second subscriber attempts a call during a call in progress on the telephone frequency band channel for a first subscriber, the call of the second subscriber is processed in the same manner as the call of the first subscriber, except that the controller 210 transmits an off-hook signal to the controller 502 of the MACS 500 on a channel assigned in advance in the transmission modem 202 without passing through the CODEC 211.

The MACS 500 informs the COT of the off-hook state by driving the subscriber interface 505. Then, the COT provides dial tones. The CODEC of the subscriber interface 505 converts the dial tones to PCM data and transmits PCM voice data to the telephone on a channel assigned for voice in the transmission modem 202 through the subscriber line interface 201, the transmission modem 202, the speech switch 204, the frame generator/distributor 207, the driver/receiver 208, the driver/receiver 301, the transmission/reception controller 303, the CODEC 305, and the on-hook detector 306. If the caller dials, a dial signal is processed in the same manner as for the first subscriber, except that the signal is directly transmitted to the subscriber line interface 201 from the speech switch 204 without passing through the CODEC 211.

Call Termination: two cases can be considered: a representative telephone number for two or more subscribers and different telephone numbers for the subscribers. In the case of the representative telephone number, a first incoming call occupies the telephone frequency band channel and if a second call is incoming while the telephone frequency band channel is in use, a channel assigned in the data frequency band is assigned for the second incoming call. In the case of two or more different telephone numbers, what channel to use for each number is determined and channels are used according to the determination. Upon incoming of a first call, this call uses the telephone frequency band channel and if a ring signal indicating the call incoming is transmitted to the CODEC 211 through the subscriber line interface 201, the CODEC 211 senses the ring signal and notifies the controller 210 of detection of the ring signal. The controller 210 controls the speech switch 204 to connect a speech path and notifies the subscriber associated with the incoming call in one of the above-described methods.

The present invention has the advantages that (1) a home network is easily built in a home or a small office utilizing an existing telephone line without the need for separately installing an additional line; (2) one subscriber line can be used in the home network as if there were a plurality of telephone lines; (3) an extension call and call forwarding is available between telephones in the home network; and (4) data communication can be made between PCs in the home network.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An integrated access system in an ADSL (Asymmetric Digital Subscriber Line) system, comprising:

a Multiservice Access Concentrator System (MACS) and an Integrated Access Device (IAD) in communication with each other using an Asymmetric Digital Subscriber Line (ADSL);

the MACS having downlink channels that include a plurality of voice channels to transmit voice signals and a plurality of data channels to transmit data, and uplink channels that include a plurality of voice channels to receive voice signals in response to the voice signals on the downlink voice channels and a plurality of data channels to receive data in response to the data on the downlink data channels, for collecting voice signals and data destined for subscribers from a telephone network and the Internet, the voice signals and data being transmitted/received to/from the IAD in a predefined compressed format;

the IAD (Integrated Access Device) for receiving the compressed voice signals on the downlink voice channels and data on the downlink data channels, and decompressing the received voice signals and the received data and building a Time Division Multiplex (TDM) frame including the voice signals and the data and transmitting the TDM frame including the voice signals and data using a two-wire telephone line to corresponding adapters coupled to respective telephones and computers, and transmitting voice signals and data generated from the telephones and the computers to the MACS on corresponding uplink voice channels and data channels in response to the received voice signals and data.

2. The integrated access system of claim 1, wherein the IAD comprises:

a plurality of first adapters connected to the telephones and having information about TDM channels associated with the first adapters, for detecting voice signals on corresponding voice channels from the TDM format based on the channel information, transmitting the detected voice signals to the telephones, and transmitting voice signals received from the telephones on voice channels according to the channel information;

a plurality of second adapters connected to the computers and having TDM channel information associated with the second adapters, for detecting data on corresponding data channels from the TDM format based on the channel information, transmitting the detected data to the computers, and transmitting data received from the computers on data channels according to the channel information; and a home master having information about the TDM channels of the first and second adapters, for transmitting voice signals and data received on downlink voice channels and data channels in the TDM format on corresponding channels according to the channel information.

3. The integrated access system of claim 2, wherein the home master comprises:

a compressor/decompressor for separating the downlink voice signals from the downlink data, decompressing the separated data, compressing data destined for the MACS, combining the compressed data with transmission voice signals, and outputting the combined signals on uplink voice channels and data channels corresponding to the downlink voice channels and data channels;

a speech switch for TDM-switching the voice signals;

a MAC (Medium Access Controller) for TDM-switching the data;

a frame generator for generating a frame with the TDM-switched voice signals and data in the TDM format; and a controller having the channel information of the adapters, for TDM-switching the speech switch and the MAC according to the channel information and controlling the frame generator to generate the frame.

4. The integrated access system of claim 3, wherein the frame generator generates the frame using information notified from a sync channel for detecting a start point of a data frame, a telephone frequency band channel for transmitting a call process signal and a voice signal, at least one data channel for transmitting data, and a D channel for transmitting signaling signals of the telephone frequency band channel and the data channel.

5. The integrated access system of claim 3, wherein the compressor/decompressor comprises:

a subscriber line interface for separating a telephone frequency band channel signal from the downlink voice signals and data, combining a transmission telephone frequency band signal with transmission voice signals and data, and transmitting the combined signals on uplink channels corresponding to the downlink channels;

a CODEC for converting the telephone frequency band signal to a voice signal; and a transmission modem for decompressing the voice signals and data free of the voice signal of the telephone frequency band channel and separating the voice signals and data from the decompressed signals.

6. The integrated access system of claim 3, further comprising a master clock generator for generating a master clock signal to operate the IAD.

7. The integrated access system of claim 6, further comprising a signaler for receiving the master clock signal, generating ring tones under the control of the controller upon call incoming, and generating dial tones or busy tones upon call origination.

8. The integrated access system of claim 2, further comprising a power switch for bypassing a telephone frequency band channel signal received through a subscriber line to the first adapters on a power-off condition.

9. The integrated access system of claim 8, wherein the power switch is a relay.

10. The integrated access system of claim 3, wherein each of the first adapters comprises:

a driver/receiver for receiving the frame;

a clock recovery circuit for recovering a clock signal synchronized with a master clock signal from the voice signal;

a transmission/reception controller for receiving a voice signal on a corresponding channel of the frame according to the TDM channel information, converting a signal received from a telephone connected to the first adapter to a voice signal, and transmitting the voice signal on an uplink channel corresponding to the corresponding downlink channel; and a signaler for generating ring tones in accordance with the clock signal under the control of the transmission/reception controller upon call termination.

11. The integrated access system of claim 10, wherein the frame is transmitted via a telephone line.

12. The integrated access system of claim 11, further comprising a line interface for matching impedance with respect to the length of the telephone line.

13. The integrated access system of claim 12, further comprising a voltage detection and switching unit for detecting the voltage of the telephone line and bypassing a signal received via the telephone line to the telephone on a power-off condition.

14. The integrated access system of claim 3, wherein each of the second adapters comprises:
   a driver/receiver for receiving the frame;
   a clock recovery circuit for recovering a clock signal synchronized with the master clock signal from the data; and
   a transmission/reception controller for receiving data on a frame channel of the frame according to the TDM channel information, receiving data from a computer connected to the second adapter, and transmitting the data on an uplink channel corresponding to the downlink channel.

15. The integrated access system of claim 14, wherein the frame is transmitted via a telephone line.

16. The integrated access system of claim 15, further comprising a line interface for matching impedance with respect to the length of the telephone line.

17. The integrated access system of claim 16, further comprising a voltage detection and switching unit for detecting the voltage of the telephone line and bypassing a signal received via the telephone line to the computer on a power-off condition.

18. The integrated access system of claim 3, wherein the MACS comprises:
   an interface for interfacing signals with the telephone network and the Internet;
   a voice/data separation and interfacing unit for combining signals received from the telephone network under a predetermined control according to each home master;
   a transmission modem for compressing the combined signals under a predetermined control and transmitting the compressed signals through a general subscriber line; and
   a controller having channel information about each home master, for controlling the voice/data separation and interfacing unit according to the channel information and controlling the transmission modem to compress the combined signals.

19. An integrated access system having at least one telephone and at least one computer in an ADSL system, comprising:
   a first adapter connected to the telephone and having TDM channel information associated with the first adapter, for converting a voice signal received from the telephone to voice data and transmitting the voice data in a TDM frame on a corresponding TDM channel via a telephone line;
   a second adapter connected to the computer and having TDM channel information associated with the second adapter, for transmitting data received from the computer on a corresponding TDM channel in a TDM frame via the telephone line;
   a home master having information about the channels of the adapters, the home master receiving the TDM frames, separating the voice data and the data, compressing the received voice data and data received in the TDM frame and transmitting the data in a compressed format via a general subscriber line; and
   a MACS for receiving compressed data from each home master via the general subscriber line, decompressing the compressed signals, separating the decompressed signals according to destination networks, and transmitting the separated signals to the corresponding networks.

20. The integrated access system of claim 19, wherein the home master comprises:
   a frame generator/distributor for receiving channels in a predetermined TDM frame from the first and second adapters under a predetermined control and separating voice data and data from the channels;
   a speech switch for receiving the voice data under the predetermined control and TDM-switching a voice signal on a telephone frequency band channel and a voice signal on a voice channel;
   a MAC for receiving the data under the predetermined control and TDM-switching the received data;
   a transmission modem for compressing the voice data and the data;
   a CODEC for converting the voice signal of the telephone frequency band channel to voice data;
   a subscriber line interface for transmitting the voice data received from the CODEC on the telephone frequency band channel along with the compressed channel signal received from the transmission modem to the MACS through a general subscriber line; and
   a controller having information about the channels of the adapters, for controlling the speech switch, the MAC, and the frame generator/distributor according to the channel information.

21. The integrated access system of claim 20, wherein the frame includes information notified from a sync channel for detecting a start point of a data frame, a telephone frequency band channel for transmitting a call process signal and a voice signal, at least one data channel for transmitting data, and a D channel for transmitting signaling signals of the telephone frequency band channel and the data channel.

22. The integrated access system of claim 21, wherein the data channel includes at least one voice channel for transmitting voice data.

23. The integrated access system of claim 21, further comprising a master clock generator for generating a master clock signal to operate the LAD.

24. The integrated access system of claim 21, further comprising a signaler for receiving the master clock signal, generating ring tones under the control of the controller upon call incoming, and generating dial tones or busy tones upon call origination.

25. The integrated access system of claim 22, further comprising a power switch for bypassing signals from the adapters through a telephone line to a subscriber line on a power-off condition.

26. The integrated access system of claim 25, wherein the power switch is a relay.

27. The integrated access system of claim 23, wherein the first adapter comprises:
   a on-hook detector for detecting the on-hook state/off-hook state of the telephone;
   a clock recovery circuit for recovering a clock signal synchronized with the master clock signal from the voice signal;
   a signaler for generating a DTMF signal in accordance with the clock signal under the control of a transmission/reception controller upon call origination; and
   a transmission/reception controller for transmitting an hook-on/hook-off signal to the home master upon detection of the on-hook state/off-hook state, transmitting a DTMF signal on the D channel to the home master during dialing, converting a voice signal received from the telephone to a voice signal, and transmitting the voice signal on a corresponding TDM channel via the telephone line.

28. The integrated access system of claim 23, wherein the second adapter comprises:
- a buffer for buffering data received from the computer;
- a clock recovery circuit for recovering a clock signal synchronized with the master clock signal from the data; and
- a transmission/reception controller for transmitting the buffered data on a corresponding TDM channel via the telephone line.

29. The integrated access system of claim 23, wherein the MACS comprises:
- a transmission modem for decompressing a signal destined for each home received via the general subscriber line under the predetermined control;
- a voice/data separation/combining unit for separating signals received from the transmission modem according to networks under the predetermined control;
- an interface for interfacing signals with a PSTN (Public Switched Telephone Network) and the Internet; and
- a controller having channel information about each home, for controlling the voice/data separation and interfacing unit according to the channel information and controlling the transmission modem to decompress signals combined for the homes.

* * * * *